Dec. 23, 1969 C. MONIN 3,486,035

MAGNETOSTATIC RELAY

Filed June 14, 1965

INVENTOR
CLAUDE MONIN
BY Paul M. Craig, Jr.
ATTORNEY

1

3,486,035
MAGNETOSTATIC RELAY
Claude Monin, Villennes-s-Seine, Yvelines, France, assignor to Cit-Compagnie Industrielle des Telecommunications, Paris, France, a French corporation
Filed June 14, 1965, Ser. No. 463,653
Claims priority, application France, June 15, 1964, 978,316
Int. Cl. H01f 27/42, 31/06, 35/00
U.S. Cl. 307—88 8 Claims

ABSTRACT OF THE DISCLOSURE

Magnetostatic relay wherein a transistor switch is controlled from the output winding of a magnetic amplifier operating as a variable loss transformer with an A.C. source connected to a power winding thereof so as to isolate electrically the A.C. source from the transistor switch, and a threshold circuit connected between the magnetic amplifier and the transistor switch for eliminating residual signals in the magnetic amplifier during saturation thereof.

Figure 1:
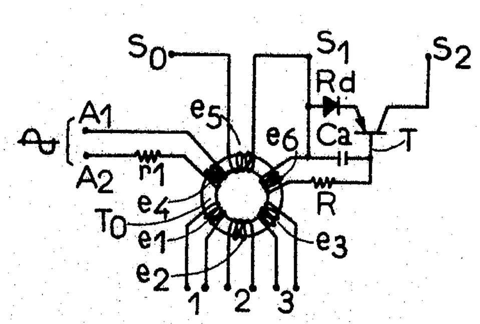

The present invention relates in general to improvements in magnetostatic relays of the type comprising a magnetic amplifier and a transistor switching circuit controlled by said magnetic amplifier between states of conduction and non-conduction, and more particularly relates to a novel arrangement of said magnetic amplifier and transistor switching circuit so as to effectively isolate the normally provided alternating current supply to the magnetic amplifier from the output of the transistor switching circuit.

The magnetostatic relays of the prior art which provide an alternating current power source connected through the load winding to the control input of the transistor switching circuit deliver a positive voltage output as a result of this direct electrical application of the alternating current supply to the transistor switching circuit, which positive voltage output is in turn applied to the circuit to be controlled. However, where the circuit to be controlled is connected to a negative voltage or carries information signals at a negative voltage bias, a resultant interference in the control circuit may occur which may be sufficient to render this circuit inoperative.

In order to control the switching of all circuits without regard to the bias thereof and without danger of interence within the circuit, it is advantageous to utilize a relay having an output circuit which forms a two-stage dipole, having only open or closed conditions for a DC current, and which may therefore be inserted in a series fashion into any circuit to be controlled without danger of influence upon the control circuit by the relay arrangement.

The relay according to the present invention provides an arrangement which will solve the problems of the prior art in a simple and efficient manner. The relay according to the invention comprises an output transistor and a magnetic amplifier with an alternating current supply circuit for the magnetic ampliler connected to a separate winding isolated from an output winding which is connected to the control circuit of the output transistor. The magnetic amplifier then operates as a variable loss transformer and not as a variable inductance, thereby providing the isolation necessary for preventing interference or undue influence between the alternating current supply and the circuit to be controlled.

It is therefore an object of the instant invention to provide a magnetostatic relay including a magnetic amplifier having a primary winding supplied from an alternating current supply source and a separate secondary load winding connected to the output transistor switching circuit.

2

It is another object of the instant invention to provide a magnetostatic relay which also includes a threshold circuit inserted between the secondary winding of the magnetic amplifier and the output transistor so as to eliminate the residual signals delivered at the secondary winding terminals and, in this way, to make the transistor nonconducting for ampere turn values corresponding to saturation of the magnetic circuit.

It is a general object of the present invention to provide a magnetostatic relay including a magnetic amplifier and a transistor switching circuit wherein the alternating current supply source of the magnetic amplifier is effectively electrically isolated from the input of the transistor switching circuit.

Figure 2:
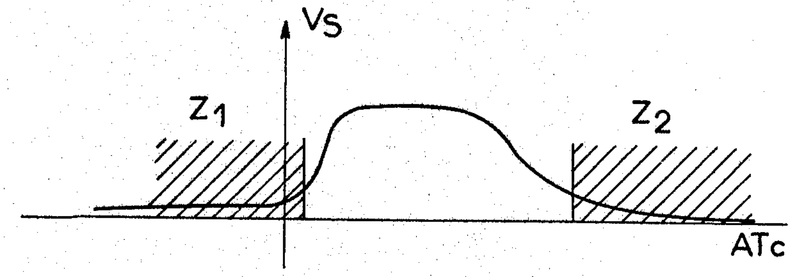
Figure 3:
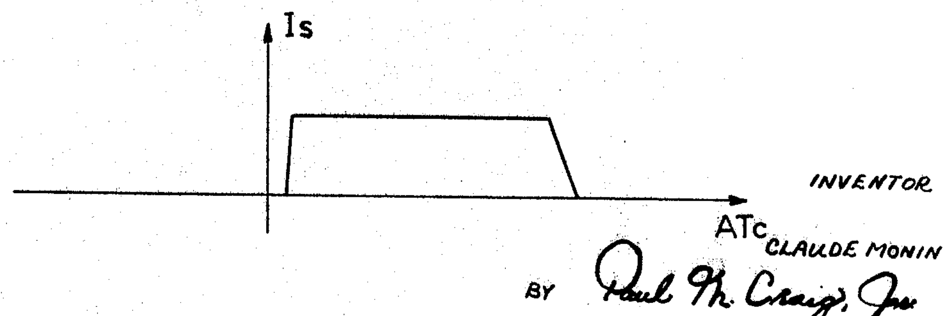

These and other objects, features, and advantages of the present invention will become more obvious from the following description when taken in connection with the accompanying drawing which shows, for purposes of illustration only, one embodiment of the instant invention, wherein:

FIGURE 1 shows a schematic diagram of a magnetostatic relay arrangement according to one embodiment of the instant invention; and FIGURES 2 and 3 are curves relating to the operation of the relay arrangement illustrated in FIGURE 1.

Looking now to the drawing and especially to FIGURE 1, the relay illustrated therein comprises a saturable magnetic core $T_0$ upon which are wound control windings $e_1$, $e_2$, $e_3$, a primary winding $e_4$ fed with square wave signals from an alternating current supply $A_1$, $A_2$ through a resistor $r_1$ and a secondary winding $e_6$ which feeds the emitter base circuit of a output transistor P. The alternating current voltage generated in the winding $e_6$ varies as a function of the direct current ampere turns $AT_c$ flowing through the control windings $e_1$, $e_2$, $e_3$ of the magnetic amplifier.

FIGURE 2 shows a response curve indicating variations of the root-mean-square value of the voltage $V_s$ generated in the secondary winding $e_6$ as a function of the control ampere-turns $AT_c$. The hatched areas in the FIGURES designated $Z_1$ and $Z_2$ correspond to residual voltage levels generated in the winding $e_6$ due to the saturation of the magnetic circuit.

In order to render the output transistor T nonconductive for the ampere turn values of the magnetic amplifier corresponding to saturation of the magnetic circuit, it is required that the residual signals generated in the winding $e_6$, which result from the fact that the hysterisis cycle of the magnetic material is not perfectly rectangular, be eliminated. This function is performed by a threshold circuit comprising a resistor R connected between one end of the winding $e_6$ and the base electrode of the transistor T, a capacitor $C_a$ connected between the other end of the winding $e_6$ and the base electrode of the transistor T, and a diode R*d* connected between the winding $e_6$ and the emitter electrode of the transistor T. The output is then taken at terminals $S_1$ and $S_2$.

FIGURE 3 shows the characteristics of the magnetostatic relay in accordance with the instant invention including the threshold circuit, wherein the output transistor emitter current $I_s$ is taken on the ordinate and the control ampere turns $AT_c$ is provided on the abscissa. The elimination of the residual voltages generated in the winding $e_6$ from the output of the transistor T is evident from the curve of FIGURE 3.

A feedback winding $e_5$ may also be provided between the secondary winding $e_6$ and an output terminal $S_0$. This feedback winding may be providing to give the magnetostatic relay bistable characteristics.

The important feature of the arrangement according to the invention is that the output circuit of the transistor T constitutes a dipole independent of any fixed supply voltage source. As a result, the relay in accordance with the invention may be utilized with any circuit for control thereof without danger of interference or unwanted influence upon the control circuit by the relay arrangement. The only limitation to the use of the magnetostatic relay of the invention for control of circuits is that it not be required to withstand extremely high voltage differences and that the precaution be taken to place the emitter in the part of the circuit where the voltage is highest.

The relay according to the invention has been described with reference to use of a PNP type transistor but it is obviously that an NPN transistor could be used similarly by reversing the voltage supply polarities in the direction of the diodes.

While I have shown and described one embodiment in accordance with the present invention, it is understood that the same is not limited thereto but is susceptible to numerous changes and modifications as known to a person skilled in the art. I therefore do not wish to be limited to the details shown and described herein but intend to cover all such changes and modifications as are encompassed by the scope of the appended claims.

I claim:

1. A magnetostatic relay comprising:
magnetic amplifier means including an alternating current supply circuit, and
output transistor means having conducting and non-conducting states and including control circuit means for determining the state of said output transistor means,
said magnetic amplifier means being connected to said control circuit means with said alternating current supply circuit being electrically isolated from said output transistor means,
said magnetic amplifier means including primary and secondary windings, said primary winding being connected to said alternating current supply circuit and said secondary winding being connected to said output transistor means,
threshold circuit means connected between said secondary winding and said output transistor means for eliminating residual signals in said secondary winding generated during saturation of said magnetic amplifier means.

2. A magnetostatic relay comprising:
magnetic amplifier means including an alternating current supply circuit, and
output transistor means having conducting and non-conducting states and including control circuit means for determining the state of said output transistor means,
said magnetic amplifier means being connected to said control circuit means with said alternating current supply circuit being electrically isolated from said output transistor means,
said magnetic amplifier means including primary and secondary windings, said primary winding being connected to said alternating current supply circuit and said secondary winding being connected to said output transistor means,
threshold circuit means connected between said secondary winding and said output transistor means for eliminating residual signals in said secondary winding generated during saturation of said magnetic amplifier means,
said threshold circuit means including a resistor in series connection with said secondary winding, and a capacitor connectd in series with a diode between the base and emitter of said output transistor means.

3. A magnetostatic relay comprising:
magnetic amplifier means including an alternating current supply circuit, and
output transistor means having conducting and non-conducting states and including control circuit means for determining the state of said output transistor means,
said magnetic amplifier means being connected to said control circuit means with said alternating current supply circuit being electrically isolated from said output transistor means,
said magnetic amplifier means including primary and secondary windings, said primary winding being connected to said alternating current supply circuit and said secondary winding being connected to said output transistor means,
threshold circuit means connected between said secondary widing and said output transistor means for eliminating residual signals in said secondary winding generated during saturation of said magnetic amplifier means,
feedback winding means on said magnetic amplifier means connected between the emitter of said output transistor means and a voltage supply circuit.

4. A magnetostatic relay comprising:
magnetic amplifier means including a power winding and a load winding.
output transistor means including a transistor having base emitter and collector electrodes, said load winding being connected between the base and emitter electrodes of said transistor, and
alternating current supply means connected to said power winding of said magnetic amplifier means,
threshold circuit means connected between said load winding and said output transistor means for eliminating residual signals in said load winding generated during saturation of said magnetic amplifier means.

5. A magnetostatic relay comprising:
magnetic amplifier means including a power winding and a load winding,
output transistor means including a transistor having base, emitter and collector electrodes, said load winding being connected between the base and emitter electrodes of said transistor, and
alternating current supply means connected to said power winding of said magnetic amplifier means,
threshold circuit means connected between said load winding and said output transistor means for eliminating residual signals in said load winding generated during saturation of said magnetic amplifier means,
said threshold circuit means including a resistor in series connection with said load winding, and a capacitor connected in series with a diode between the base and emitter of said output transistor means.

6. A magnetostatic relay comprising:
magnetic amplifier including a power winding, a load winding and at least one control winding,
an alternating current supply connected to said power winding of said magnetic amplifier,
an output transistor including emitter, base and collector electrodes, and
a threshold circuit connecting said load winding with said transistor including a resistor interconnecting one end of said load winding and the base of said transistor, a diode interconnecting the other end of said load winding and the emitter of said transistor, and a capacitor interconnecting said other end of said load winding and the base of said transistor.

7. A magnetostatic relay comprising:
magnetic amplifier means provided in the form of a variable loss transformer including a primary winding connected to an alternating current supply circuit and a secondary winding, and
output transistor means having an input control circuit, said magnetic amplifier means being connected by way of said secondary winding to said input control circuit with said alternating current supply circuit being electrically isolating therefrom,
threshold circuit means connected between said secondary winding and said output transistor means for eliminating residual signals in said secondary winding generated during saturation of said magnetic amplifier means.

8. A magnetostatic relay comprising:

magnetic amplifier means provided in the form of a variable loss transformer including a primary winding connected to an alternating current supply circuit and a secondary winding, and output transistor means having an input control circuit, said magnetic amplifier means being connected by way of said secondary winding to said input control circuit with said alternating current supply circuit being electrically isolated therefrom, threshold circuit means connected between said secondary winding and said output transistor means for eliminating residual signals in said secondary winding generated during saturation of said magnetic amplifier means, said threshold circuit means including a resistor in series connection with said secondary winding, a capacitor connected in series with a diode between the base and emitter of said output transistor means.

References Cited

UNITED STATES PATENTS

| | | | |
|---|---|---|---|
| 2,870,268 | 1/1959 | Mamon | 323—89 X |
| 3,247,326 | 4/1966 | Clark | 323—89 X |
| 2,915,645 | 12/1959 | Monin | 307—88 |
| 2,946,896 | 7/1960 | Alizon et al. | 307—88 |
| 2,954,482 | 9/1960 | Alizon | 307—88 |
| 3,093,746 | 6/1963 | Burstow et al. | 307—88 |
| 3,132,256 | 5/1964 | Giel | 307—88 |
| 3,127,519 | 3/1964 | Schuringa et al. | 307—88 |
| 3,296,454 | 1/1967 | Kolb | 307—88 |

STANLEY M. URYNOWICZ, Jr., Primary Examiner